United States Patent [19]

Saito et al.

[11] 4,431,237
[45] Feb. 14, 1984

[54] TAPE CASSETTE STORAGE BOX

[75] Inventors: Shoichi Saito; Hideo Shirako, both of Tokyo, Japan

[73] Assignee: Olympus Optical Co., Ltd., Tokyo, Japan

[21] Appl. No.: 318,036

[22] Filed: Nov. 4, 1981

[30] Foreign Application Priority Data

Nov. 11, 1980 [JP] Japan .......................... 55-160966[U]

[51] Int. Cl.³ ...................... A47B 81/06; B65D 85/67
[52] U.S. Cl. ...................................... 312/9; 312/12; 312/111; 206/387
[58] Field of Search .................... 312/8, 9, 12, 13, 14, 312/15, 111, 20; 206/387

[56] References Cited

U.S. PATENT DOCUMENTS

| | | | |
|---|---|---|---|
| 3,272,325 | 9/1966 | Schoenmakers | 206/387 |
| 3,751,127 | 8/1973 | Black, Jr. et al. | 312/111 |
| 3,836,222 | 9/1974 | Kuntze | 206/387 |
| 3,899,229 | 8/1975 | Ackeret | 206/387 |
| 3,999,818 | 12/1976 | Schankler | 312/111 |
| 4,227,758 | 10/1980 | Clare | 312/111 |
| 4,266,834 | 5/1981 | Ackeret | 312/12 |
| 4,275,943 | 6/1981 | Gelardi et al. | 312/12 |

Primary Examiner—Victor N. Sakran
Attorney, Agent, or Firm—Frishauf, Holtz, Goodman and Woodward

[57] ABSTRACT

A tape cassette storage box comprises a first click-type engaging means disposed in a first corner region of a first lateral face of the body, a second click-type engaging means disposed in a second corner region of the first lateral face and having the same length and the same direction for engagement as those of the first click-type engaging means, a third click-type engaging means disposed in a third corner region of said first lateral face and having the same length and the same direction for engagement as those of the first click-type engaging means, and a fourth engaging click disposed in a fourth corner region of the first lateral face and having the same length and the same direction for engagement as those of the first click-type engaging means, a first click-type engaging means disposed in a first corner region of a second lateral face, a second click-type engaged means disposed in a second corner region of the second lateral face and having the same length and the same direction for engagement as those of the first click-type engaging means, a third click-type engaged means disposed in a third corner region of the second lateral face and having the same length and the same direction for engagement as those of the first engaged click, and a fourth click-type engaged means disposed in a fourth corner region of the second lateral face and having the same length and the same direction for engagement as those of the first click-type engaged means.

15 Claims, 22 Drawing Figures

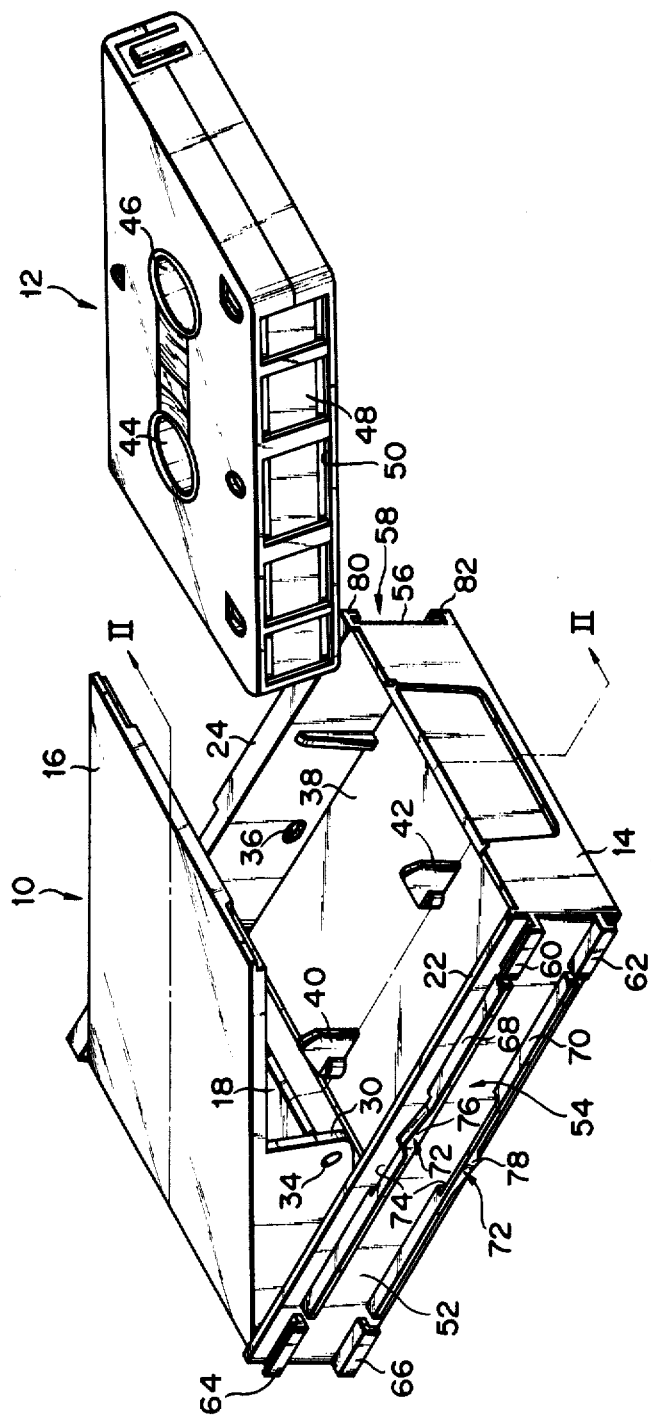

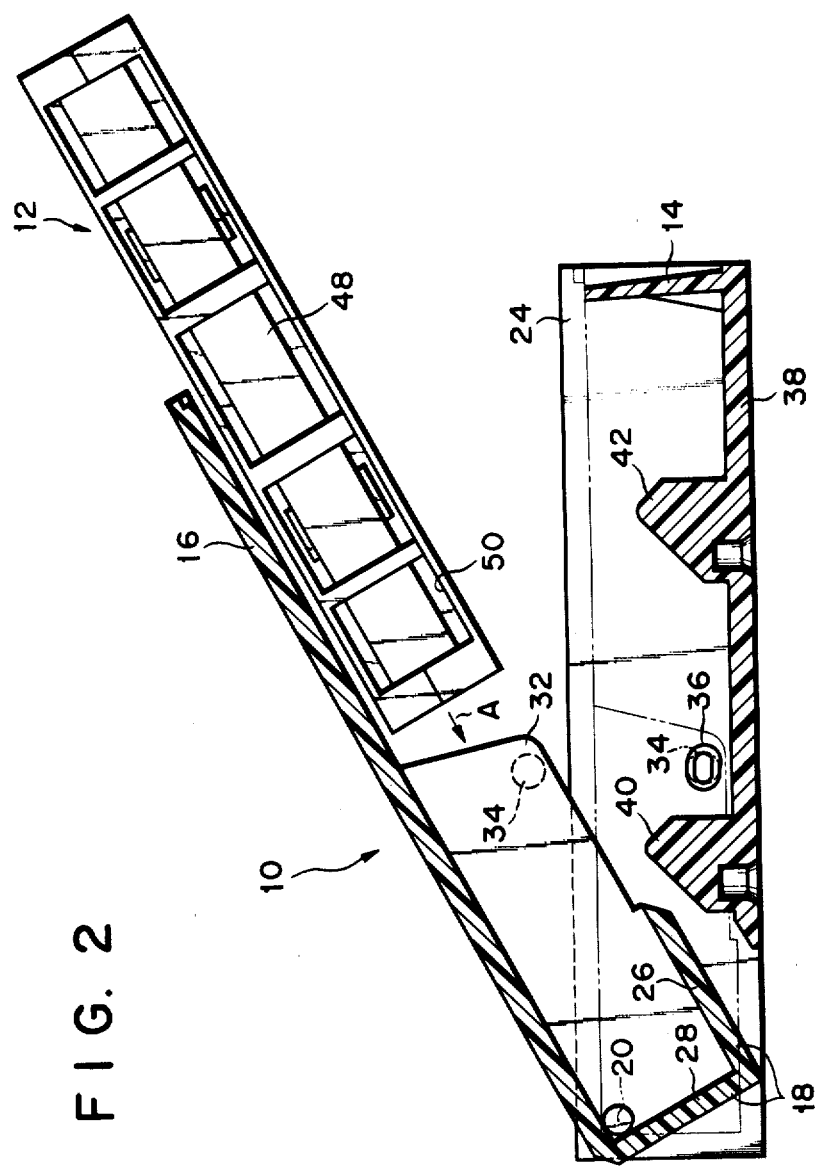

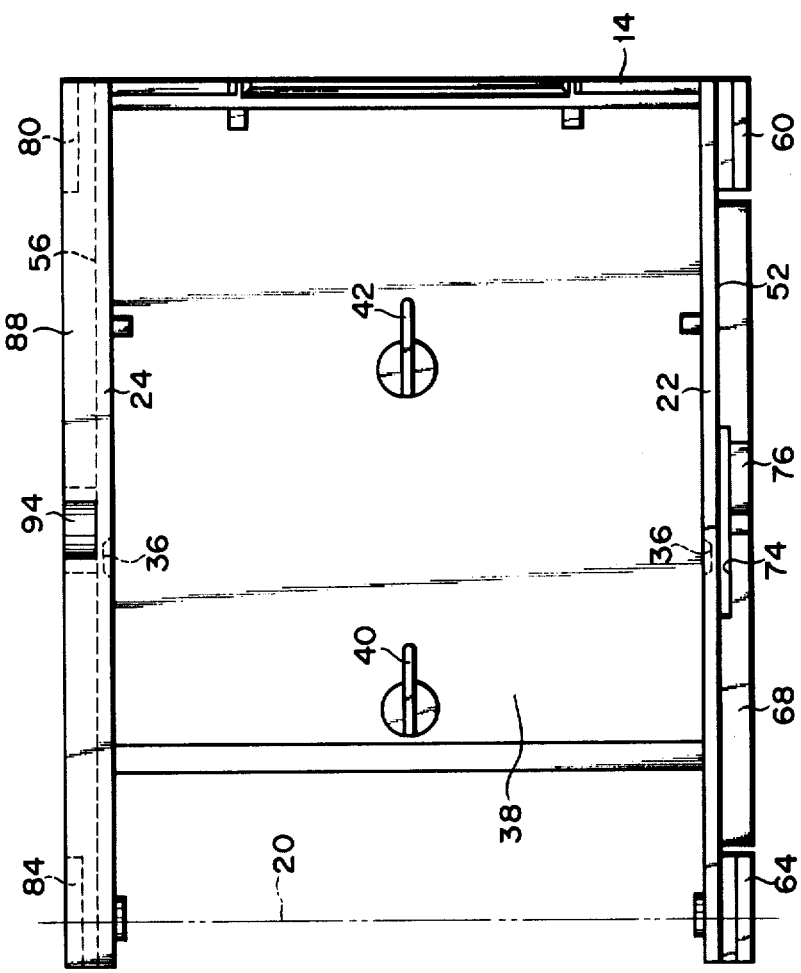

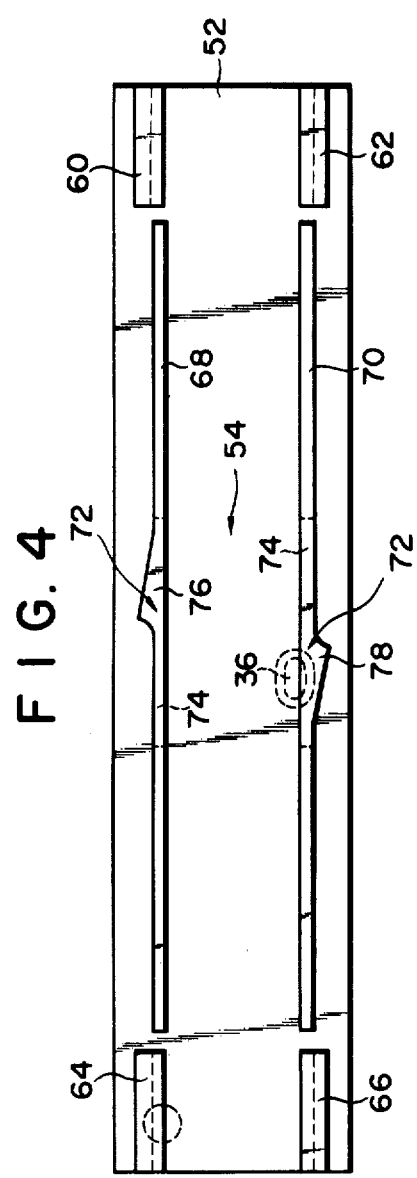
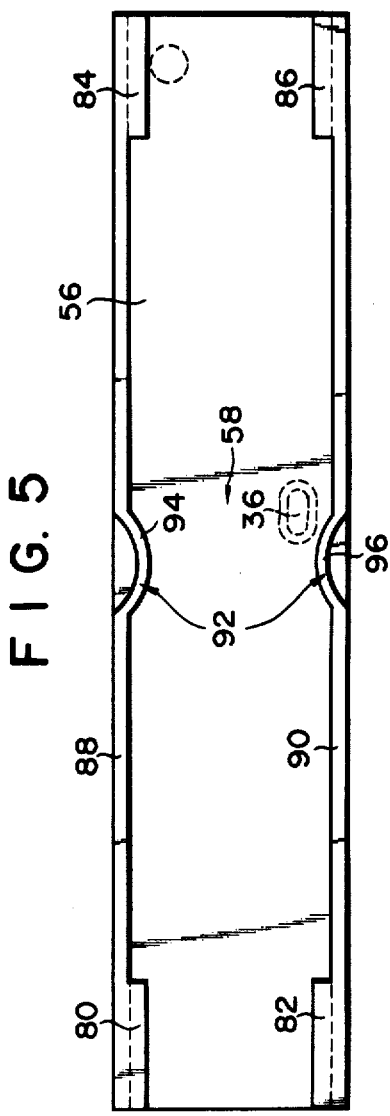

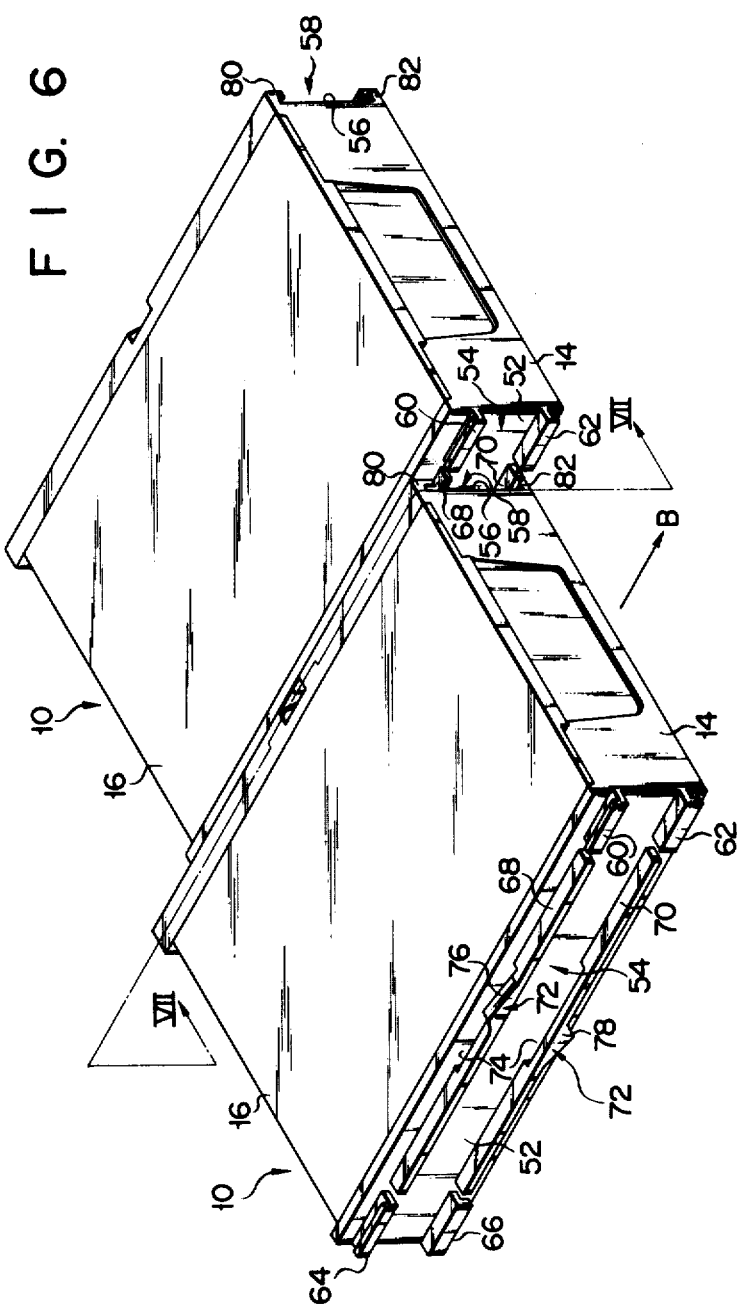

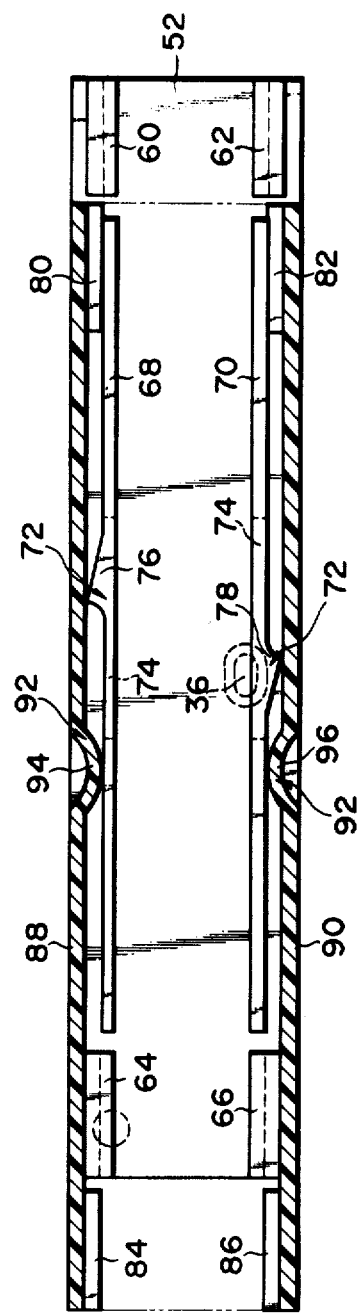
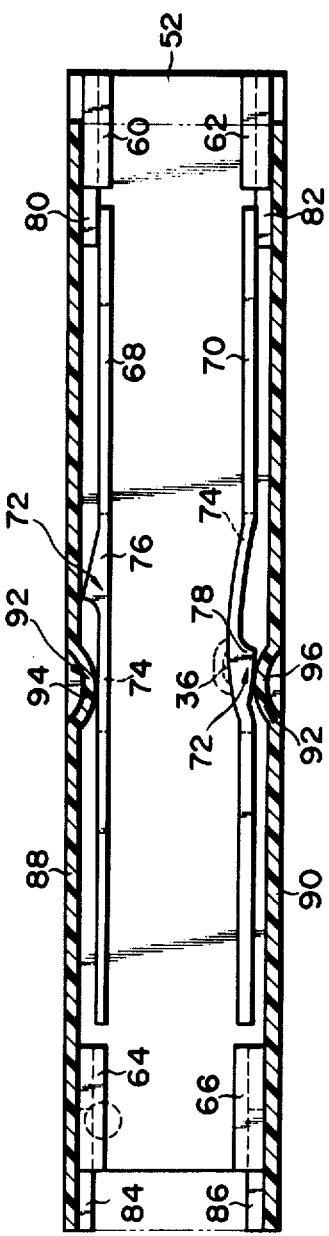

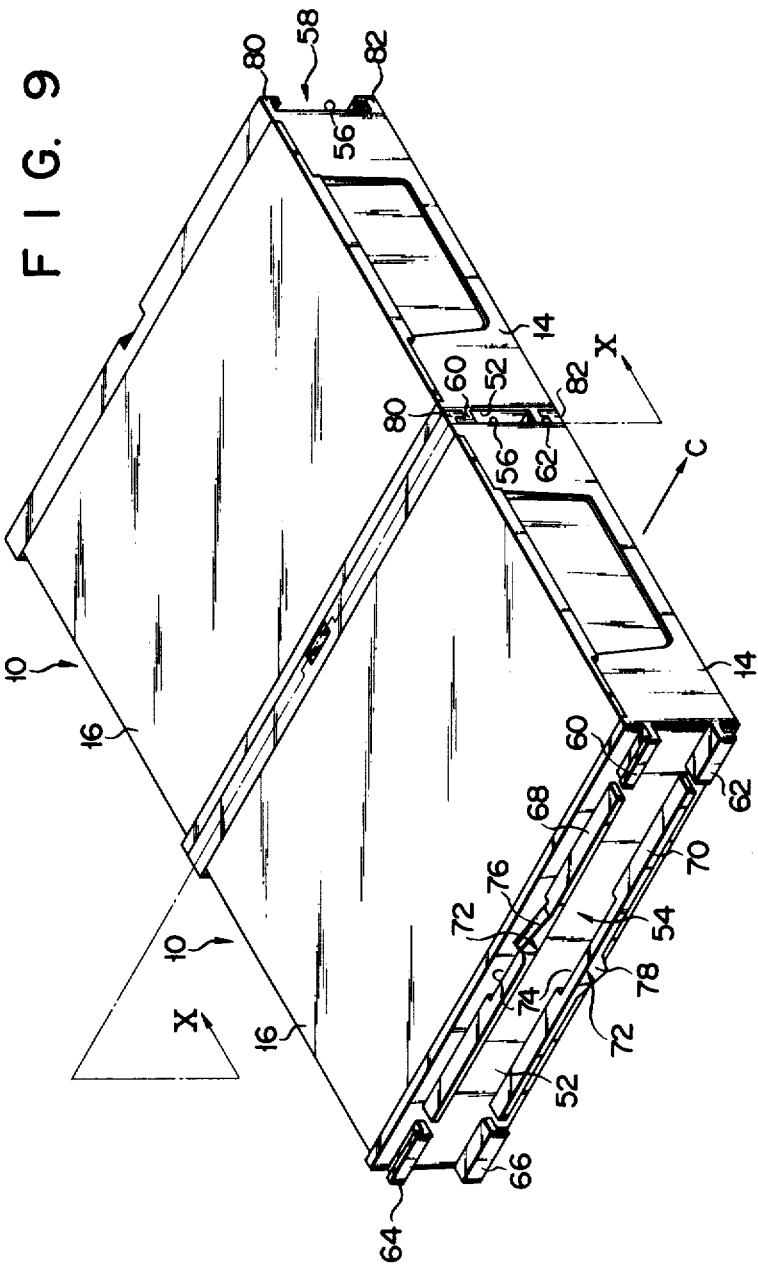

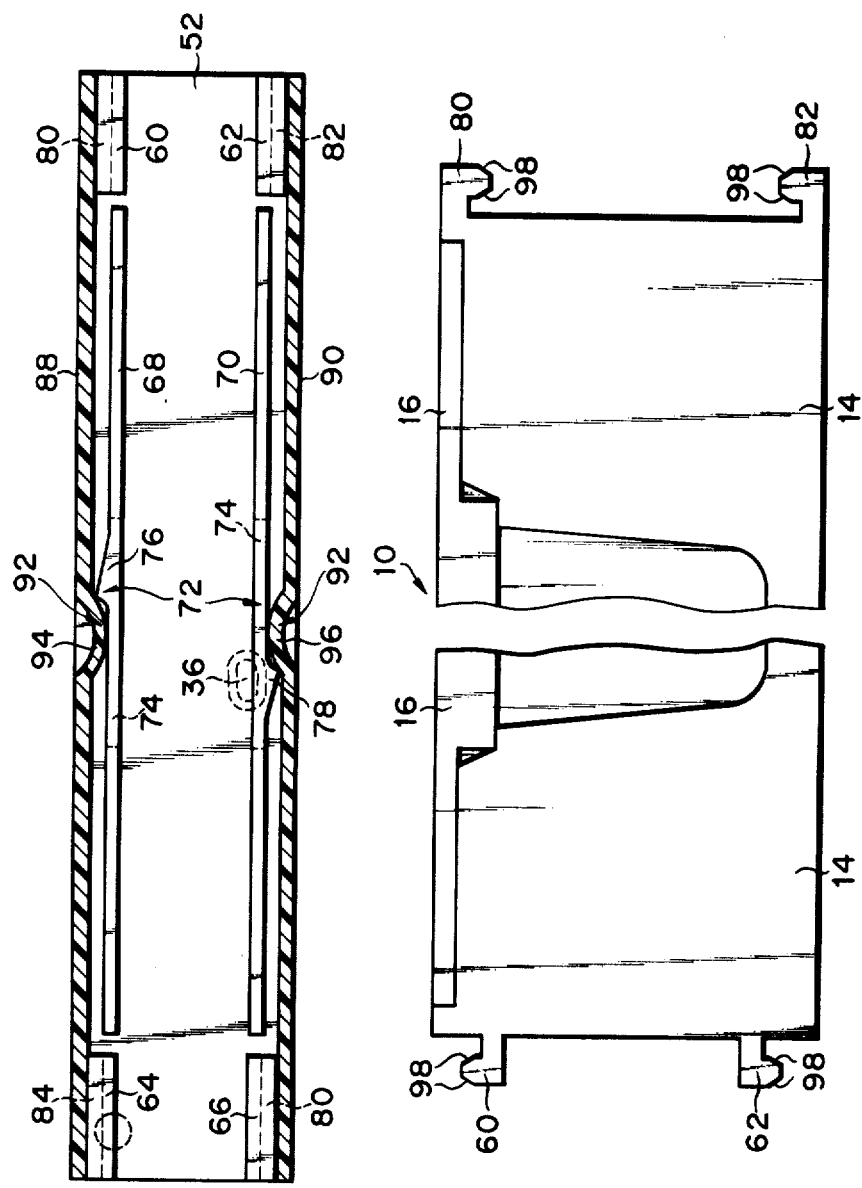

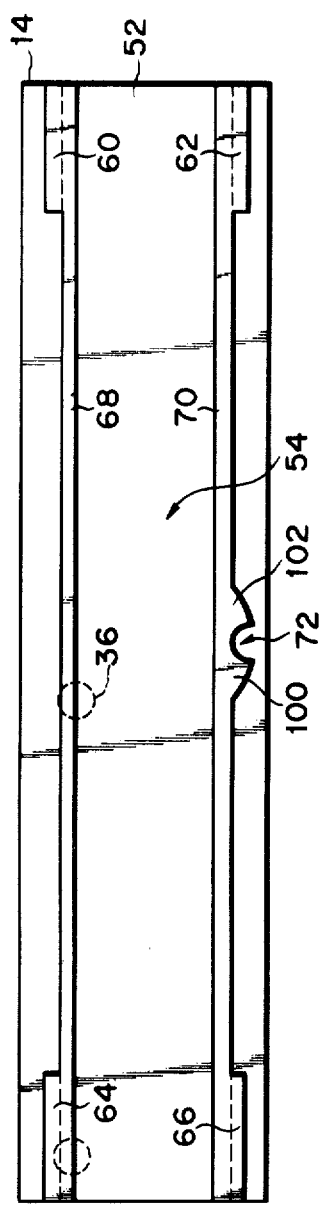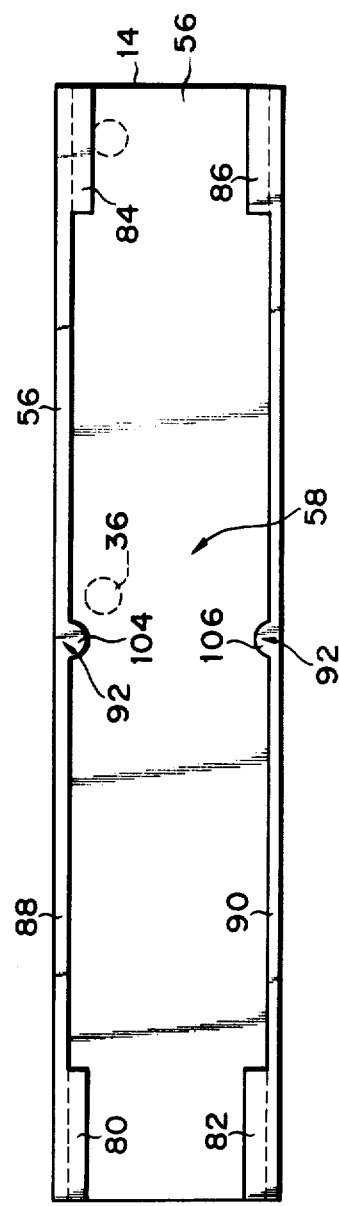

TAPE CASSETTE STORAGE BOX

BACKGROUND OF THE INVENTION

This invention relates to a tape cassette storage box, more specifically to a tape cassette storage box capable of storing a micro cassette and having engaging means for engagement with another tape cassette storage box.

Conventionally known is a tape cassette storage box which comprises a storage box body for holding a micro cassette, a cover coupled with the storage box body so as to be able to rotate between a first position in which the cover houses, in cooperation with the storage box body, the micro cassette held in the storage box body and a second position in which the cover allows the micro cassette to be removed from the storage box body, a first engaging means formed on a first lateral face out of two rectangular lateral faces of the storage box body intersecting the axis of rotation of the cover, and a second engaging means formed on a second lateral face of the storage box body.

In engaging or disengaging the first engaging means of one of two conventional tape cassette boxes with the above-mentioned construction with or from the second engaging means of the other, it is necessary to move the second lateral face of the other tape cassette storage box along the first lateral face of the one tape cassette storage box through a distance equal to the length of one edge of the first lateral face.

Thus, it is troublesome to engage or disengage the first engaging means of one of two conventional tape cassette storage boxes with or from the second engaging means of the other.

SUMMARY OF THE INVENTION

The object of this invention is to provide a tape cassette storage box of a simple construction capable of facilitating the engagement and disengagement between the first engaging means of one of two tape cassette storage boxes and the second engaging means of the other.

BRIEF DESCRIPTION OF THE DRAWINGS

FIG. 1 is a perspective view showing a tape cassette storage box according to a first embodiment of this invention and a micro cassette;

FIG. 2 is a sectional view taken along line II—II of FIG. 1;

FIG. 3 is a plan view of the main body of the tape cassette storage box of FIG. 1;

FIG. 4 is a side view showing the left-hand side or a first lateral face of the main body of the tape cassette storage box of FIG. 1;

FIG. 5 is a side view showing the right-hand side or a second lateral face of the main body of the tape cassette storage box of FIG. 1;

FIG. 6 is a perspective view showing a state immediately before a second engaging means on the second lateral face of a first tape cassette storage box according to the first embodiment and a first engaging means on the first lateral face of a second tape cassette storage box according to the first embodiment engage each other;

FIG. 7 is a sectional view taken along line VII—VII of FIG. 6;

FIG. 8 is a sectional view taken along the same line as FIG. 7, showing a process in which the second engaging means of the first tape cassette storage box and the first engaging means of the second tape cassette storage box engage each other;

FIG. 9 is a perspective view showing a state in which the second engaging means on the second lateral face of the first tape cassette storage box and the first engaging means on the first lateral face of the second tape cassette storage box are engaged with each other;

FIG. 10 is a sectional view taken along line X—X of FIG. 9;

FIG. 11 is an enlarged front view showing the front end face of the tape cassette storage box of FIG. 1;

FIG. 16 is a side view showing the left-hand side or a first lateral face of the tape cassette storage box of FIG. 15;

FIG. 17 is a side view showing the right-hand side or a second lateral face of the tape cassette storage box of FIG. 15;

Figure 12:
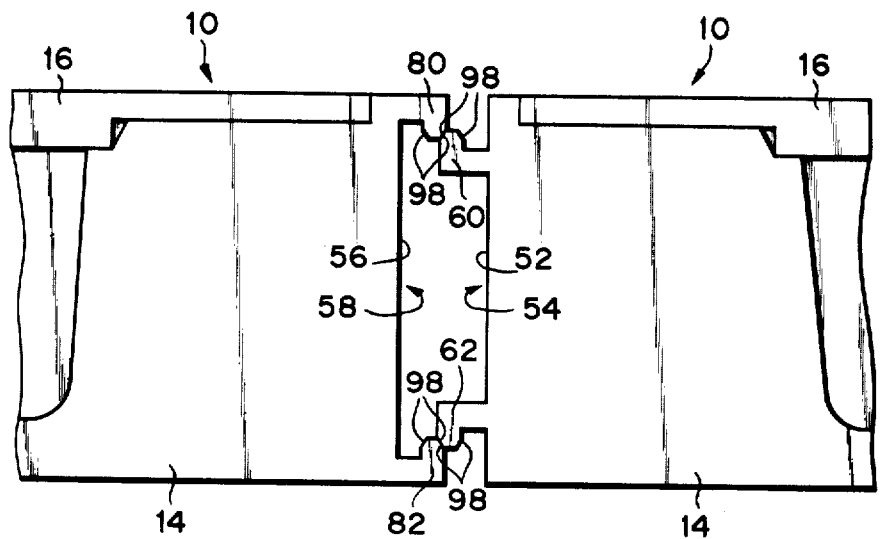
FIG. 12 is a front view showing a state in which the respective chamfer portions of first and second engaged clicks of the second engaging means on the second lateral face of the first tape cassette storage box are severally in contact with the respective chamfer portions of first and second engaging clicks of the first engaging means on the first lateral face of the second tape cassette storage box.

Now there will be described the preferred embodiments of this invention with reference to the accompanying drawings.

DETAILED DESCRIPTION OF THE PREFERRED EMBODIMENTS

Referring now to the drawing of FIG. 1, there are shown a tape cassette storage box 10 according to a first embodiment of this invention and a micro cassette 12. Throughout this specification, the term "engaging click" refers to a "click-type engaging means", and the term "engaged click" refers to a "click-type engaged means".

The tape cassette storage box 10 has a storage box body 14 for holding the micro cassette 12, and is coupled with a cover 16 by a conventional means, such as a combination of pins and holes. The cover 16 can rotate between a first position as indicated by the chain line in FIG. 2 and a second position as indicated by the solid line in FIGS. 1 and 2. As shown in detail in FIG. 2, the cover 16 of this embodiment is provided with a kangaroo pocket member 18 for holding the micro cassette 12 and moving it between the first and second positions together with the cover 16. The micro cassette 12 may be set in the kangaroo pocket member 18 by pushing the micro cassette 12 in the direction of arrow A along the inside of the cover 16 located in the second position, as shown in FIG. 2. Further, the micro cassette 12 may be removed from the kangaroo pocket member 18 by moving the micro cassette 12 in the opposite direction to arrow A along the inside of the cover 16 located in the second position.

The micro cassette 12 located together with the cover 16 in the first position is housed in a combination of the cover 16 and the storage box body 14. As mentioned before, on the other hand, the micro cassette 12 located together with the cover 16 in the second position can be removed from the storage box body 14.

As shown in FIG. 2, the axis of rotation 20 of the cover 16 of this embodiment intersects the rear end portions of the upper edges of first and second side walls (left- and right-hand side walls in FIG. 1) 22 and 24 of the storage box body 14. Accordingly, when the cover 16 is rotated between the first and second positions, the locus of rotation of bottom and rear walls 26 and 28 of the kangaroo pocket member 18 never project into the space outside the region defined between the first and second side walls 22 and 24, as shown in FIG. 2. Thus, the micro cassette 12 may be set in or removed from the tape cassette storage box 10 with the storage box body 14 of the tape cassette storage box 10 kept in one of a plurality of cavities of a book-type binder for holding the storage box body 14.

As shown in FIGS. 1 and 2, moreover, a substantially semispherical projection 34 projecting outward is formed on the outer surface of each of left- and right-hand walls 30 and 32 of the kangaroo pocket member 18 in the tape cassette storage box 10 of this embodiment. The locus of rotation of the left- and right-hand walls 30 and 32 of the kangaroo pocket member 18 obtained when the cover 16 rotates between the first and second positions are parallel with the inner surfaces of the first and second side walls 22 and 24 of the storage box body 14, respectively. When the cover 16 is located in the first position of FIG. 2, the projections 34 on the left- and right-hand walls 30 and 32 of the kangaroo pocket member 18 engage cavities 36 formed severally in the inner surfaces of the first and second side walls 22 and 24 of the storage box body 14, as shown in FIGS. 1, 2 and 3. As shown in detail in FIGS. 1 and 2, the cavities 36 of this embodiment are in the shape of ellipses with their major axes along the longitudinal direction of the first and second side walls 22 and 24, severally. Accordingly, dimensional errors of the cavities 36, which may be caused by thermal contraction of the storage box body 14 when it is formed out of a plastic material by injection molding, will never constitute any hindrance to the engagement between the projections 34 and the cavities 36.

As shown in FIGS. 1 to 3, a pair of reel hub stopper members 40 and 42 are formed on the inner surface of a bottom wall 38 of the storage box body 14. The pair of reel hub stopper members 40 and 42 engage radial projections (not shown) on the inner peripheral surfaces of a pair of reel hubs 44 and 46 of the micro cassette 12 held by the kangaroo pocket member 18 and located together with the cover 16 in the first position, thereby preventing the reel hubs 44 and 46 from rotating. Thus, the micro cassette 12 contained in the tape cassette storage box 10 can prevent a magnetic recording tape 48 wound round the pair of reel hubs 44 and 46 from being slacked by vibration externally applied to the cassette storage box 10 being carried. As a result, one of the causes of wow or flutter can be removed, and the magnetic recording tape 48 can be prevented from being exposed from a pinch roller-magnetic head insertion window 50 of the micro cassette 12 to the outside space to be damaged.

As shown in detail in FIG. 4, the outer surface of the first side wall 22 of the storage box body 14, i.e. a first lateral face 52, is rectangular, having a first engaging means 54 formed thereon. Likewise, as shown in detail in FIG. 5, the outer surface of the second side wall 24 of the storage box body 14, i.e. a second lateral face 56, is rectangular, having a second engaging means 58 formed thereon.

The first engaging means 54 includes first and third engaging clicks 60 and 64 formed at the right and left end portions near the upper edge (hereinafter referred to as first and third corner regions, respectively) of the first lateral face 52, respectively, and second and fourth engaging clicks 62 and 66 formed at the right and left portions near the lower edge (hereinafter referred to as second and fourth corner regions, respectively) of the first lateral face 52, respectively, as shown in detail in FIG. 4.

The first and third engaging clicks 60 and 64 protrude from the first lateral face 52 substantially at right angles thereto with their projected end portions bent upward or away from the second and fourth engaging clicks 62 and 66, as shown in FIG. 4. The first and third engaging clicks 60 and 64 are of a size and of the same shape.

Likewise, the second and fourth engaging clicks 62 and 66 protrude from the first lateral face 52 substantially at right angles thereto with their projected end portions bent downward or away from the first and third engaging clicks 60 and 64, as shown in FIG. 4. The second and fourth engaging clicks 62 and 66 are exactly like the first engaging click 60 except that the projected end portions of the second and fourth engaging clicks 62 and 66 are bent in the opposite direction to that of the first engaging click 60.

As shown in detail in FIG. 4, the first engaging means 54 further includes first and second guide members 68 and 70 formed between the first and third engaging clicks 60 and 64 and between the second and fourth engaging clicks 62 and 66 on the first lateral face 52, respectively.

The first guide member 68 is in the form of a band plate which extends along an imaginary straight line connecting the first and third engaging clicks 60 and 64, and protrudes substantially at right angles to the first lateral face 52.

Likewise, the second guide member 70 is in the form of a band plate which extends along an imaginary straight line connecting the second and fourth engaging clicks 62 and 66, and protrudes substantially at right angles to the first lateral face 52.

As shown in detail in FIG. 4, the first and second guide members 68 and 70 are parallel with each other. Further, the first and third engaging clicks 60 and 64 are parallel with the second and fourth engaging clicks 62 and 66, respectively.

The first to fourth engaging clicks 60, 62, 64 and 66 and the first and second guide members 68 and 70 are formed integrally with the first side wall 22 by injection molding using a plastic material with elasticity, and are isolated from one another.

As shown in FIG. 4, a holding device 72 is also formed on the first lateral face 52.

The holding device 72 has openings 74 defined severally in the central regions of the first and second guide members 68 and 70 along the longitudinal direction thereof. By these openings 74, the respective central regions of the first and second guide members 68 and 70 are separated from the first lateral face 52. Thus, these central regions can be elastically bent in the vertical direction along the first lateral face 52.

As shown in FIGS. 1 and 3, the holding device 72 has a first stopper 76 protruding upward from the central portion of the upper surface of the first guide member 68. The first stopper 76 is formed on the first engaging click side of the middle position between the front and rear ends of the first lateral face 52. As shown in detail in FIG. 4, the upper surface of the first stopper 76 is composed of a gentle slope located on the front end side of the first lateral face 52, i.e. on the side of the first engaging click 60, and gradually ascending toward the rear end of the first lateral face 52, and a concave surface located on the rear end side of the lateral face 52, i.e. on the side of the third engaging click 64, and connecting the gentle slope and the upper surface of the first guide member 68.

As shown in FIGS. 1 and 3, moreover, the holding device 72 has a second stopper 78 protruding downward from the central portion of the lower surface of the second guide member 70. The second stopper 78 is formed on the fourth engaging click side of the middle position between the front and rear ends of the first lateral face 52. As shown in detail in FIG. 4, the lower surface of the second stopper 78 is composed of a gentle slope located on the rear end side of the first lateral face 52, i.e. on the side of the fourth engaging click 66, and gradually descending toward the front end of the first lateral face 52, and a concave surface located on the front end side of the first lateral face 52, i.e. on the side of the second engaging click 62, and conneting the gentle slope and the lower surface of the second guide member 70.

As shown in detail in FIG. 5, the second engaging means 58 formed on the second lateral face 56 of the storage box body 14 includes first and third engaged clicks 80 and 84 formed at the left and right end portions of the upper edge (hereinafter referred to as first and third corner regions, respectively) of the second lateral face 56, respectively, and second and fourth engaged clicks 82 and 86 formed at the left and right end portions of the lower edge (hereinafter referred to as second and fourth corner regions, respectively) of the second lateral face 56, respectively.

The first and third engaged clicks 80 and 84 protrude from the second lateral face 56 substantially at right angles thereto with their projected end portions bent downward or toward the second and fourth engaged clicks 82 and 86, as shown in FIG. 5. The first and third engaged clicks 80 and 84 are of a size and of the same shape.

Likewise, the second and fourth engaged clicks 82 and 86 protrude from the second lateral face 56 substantially at right angles thereto with their projected end portions bent upward or toward the first and third engaged clicks 80 and 84, as shown in FIG. 5. The second and fourth engaged clicks 82 and 86 and exactly like the first engaged click 80 except that the projected end portions of the second and fourth engaged clicks 82 and 86 are bent in the opposite direction to that of the second engaged click 80.

As shown in detail in FIG. 5, the second engaging means 58 further includes third and fourth guide members 88 and 90 formed between the first and third engaged clicks 80 and 84 and between the second and fourth engaged clicks 82 and 86 on the second lateral face 56, respectively.

The third guide member 88 is in the form of a band plate which extends along an imaginary straight line connecting the first and third engaged clicks 80 and 84, i.e. along the upper edge of the second lateral face 56 in this embodiment, and protrudes substantially at right agles to the second lateral face 56.

Likewise, the fourth guide member 90 is in the form of a band plate which extends along an imaginary straight line connecting the second and fourth engaged clicks 82 and 86, i.e. along the lower edge of the second lateral face 56 in this embodiment, and protrudes substantially at right angles to the second lateral face 56.

As shown in detail in FIG. 5, the third and fourth guide members 88 and 90 are parallel with each other. Further, the first and third engaged clicks 80 and 84 are parallel with the second and fourth engaged clicks 82 and 86, respectively.

The first to fourth engaged clicks 80, 82, 84 and 86 and the third and fourth guide members 88 and 90 are formed integrally with the second side wall 24 by injection molding using a plastic material with elasticity.

The first and third engaged clicks 80 and 84 and the third guide member 88 are coupled with one another to form a continuous structure. Likewise, the second and fourth engaged clicks 82 and 86 and the fourth guide member 90 are coupled with one another to form another continuous structure which is isolated from the aforesaid continuous structure including the first and third engaged clicks 80 and 84 and the third guide member 88.

As shown in FIG. 5, moreover, a held device 92 is also formed on the second lateral face 56.

The held device 92 is provided with a first engaged projection 94 protruding downward from the center of the lower surface of the third guide member 88 between the front and rear ends thereof. The under surface of the first engaged projection 94 is formed of a convex surface. A depression with its bottom face formed of a concave surface is formed in the center of the upper surface of the third guide member 88 between the front and rear ends thereof. This depression makes the first engaged projection 94 hollow. Thus, the first engaged projection 94 can be elastically bent with ease in the vertical direction along the second lateral face 56.

Also, the held device 92 is provided with a second engaged projection 96 protruding upward from the center of the upper surface of the fourth guide member 90 between the front and rear ends thereof. The upper surface of the second engaged projection 96 is formed of a convex surface. A depression with its bottom face formed of a concave surface is formed in the center of the lower surface of the fourth guide member 90 between the front and rear ends thereof. This depression makes the second engaged projection 96 hollow. Thus, the second engaged projection 96 can be elastically bent with ease in the vertical direction along the second lateral face 56.

Hereupon, the second lateral face 56 of one of two cassette tape storage boxes 10 is opposed to the first lateral face 52 of the other, and the first engaged click 80 of the second engaging means 58 of the one tape cassette storage box 10 (hereinafter referred to as first tape cassette storage box) is put on the upper surface of the first guide member 68 of the other tape cassette storage box 10 (hereinafter referred to as second tape cassette storage box) right behind the first engaging click 60, as shown in FIGS. 6 and 7. At the same time, the second engaged click 82 of the second engaging means 58 of the first tape cassette storage box 10 is applied to the lower surface of the second guide member 70 of the second tape cassette storage box 10 right behind the second engaging click 62.

Then, the first tape cassette storage box 10 is moved foward along the first lateral face 52 of the second tape cassette storage box 10, as indicated by arrow B in FIG. 6. At this time, the first and second engaged clicks 80 and 82 of the second engaging means 58 of the first tape cassette storage box 10 slide on the upper surface of the first guide member 68 and the lower surface of the second guide member 70 of the second tape cassette storage box 10, respectively, thereby guiding the first tape cassette storage box 10 in its movement relative to the second tape cassette storage box 10.

As shown in FIG. 8, the upper surface of the second engaged projection 96 of the held device 92 of the first tape cassette storage box 10 being moved abuts against the gentle slope portion on the lower surface of the second stopper 78 of the holding device 72 of the second tape cassette storage box 10 to bend the second stopper 78 upward. At the same time, the projected end portions of the first to fourth engaging clicks 60, 62, 64 and 66 of the first engaging means 54 of the first tape cassette storage box 10 engage the projected end portions of the first to fourth engaged clicks 80, 82, 84 and 86 of the second engaging means 58 of the second tape cassette storage box 10, respectively.

When the respective front end faces of the first and second tape cassette storage boxes 10 are made flush with each other, as shown in FIG. 9, the first and second engaged projections 94 and 96 of the held device 92 of the first tape cassette storage box are brought into contact with the curved surfaces of the first and second stoppers 76 and 78 of the holding device 72 of the second tape cassette storage box 10, respectively, as shown in FIG. 10.

When one of the first and second tape cassette storage boxes 10 coupled as shown in FIG. 9 is subjected to an external force exceeding a given level which is applied in the direction of arrow C of FIG. 9 or oppositely thereto, the first or second engaged projection 94 or 96 of the held device 92 of the first tape cassette storage box 10 elastically deforms the first or second stopper 76 or 78 of the holding device 72 of the second tape cassette storage box 10 in the downward or upward direction. Thus, the held device 92 of the second tape cassette storage box 10 is disengaged from the holding device 72 of the first tape cassette storage box 10. At this time, the first tape cassette storage box 10 can be moved forward or backward along the first lateral face 52 of the second tape cassette storage box 10. The first tape cassette storage box 10 moving relatively to the second tape cassette storage box 10 is released from the coupling with the second tape cassette storage box 10, as shown in FIG. 6, by moving through a distance equal to the longitudinal length or the length for engagement of the first engaging click 60, following the steps shown in FIGS. 10, 8 and 7 in order.

As shown in FIG. 11, a pair of chamfer portions 98 are formed on each of the projected ends of the first to fourth engaging clicks 60, 62, 64 and 66 of the first engaging means 54 and the first to fourth engaged clicks 80, 82, 84 and 86 of the second engaging means 58 along the longitudinal direction or the engaging direction thereof.

Figure 13:
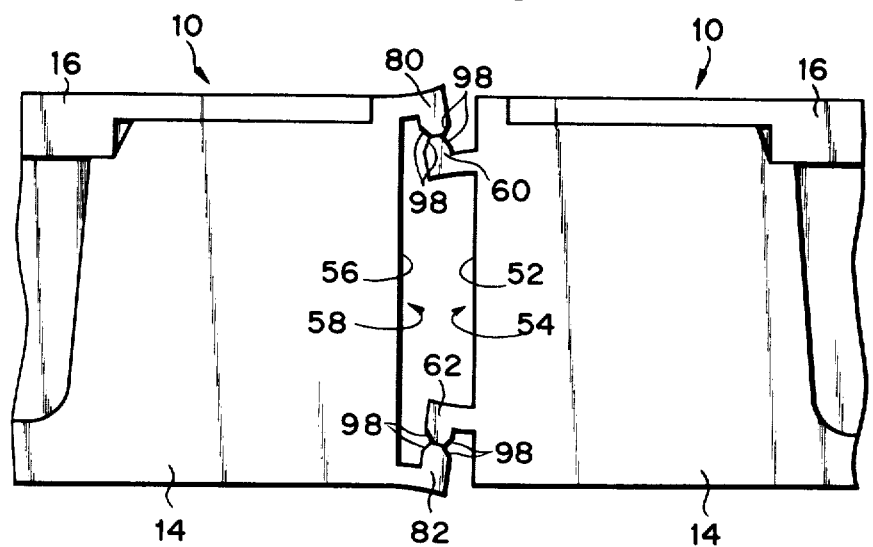
FIG. 13 is a front view showing a state in which the first and second tape cassette storage boxes of FIG. 12 are pressed against each other.

Accordingly, when the first and second tape cassette storage boxes 10 are pressed against each other after bringing the outside chamfer portions 98 of the projected ends of the first to fourth engaging clicks 60, 62, 64 and 66 of the first engaging means 54 of the second tape cassette storage box 10 into contact with the outside chamfer portions 98 of the projected ends of the first to fourth engaged clicks 80, 82, 84 and 86 of the second engaging means 58 of the first tape cassette storage box 10, as shown in FIG. 12, the first and second engaged clicks 80 and 82 of the second engaging means 58 are bent away from each other, as shown in FIG. 13.

Likewise, the third and fourth engaged clicks 84 and 86 of the second engaging means 58 of the first tape cassette storage box 10 are bent away from each other.

Further, the first and second engaging clicks 60 and 62 of the first engaging means 54 of the second tape cassette storage box 10 are bent toward each other, as shown in FIG. 13.

Likewise, the third and fourth engaging clicks 64 and 66 of the first engaging means 54 of the second tape cassette storage box 10 are bent toward each other.

Figure 14:
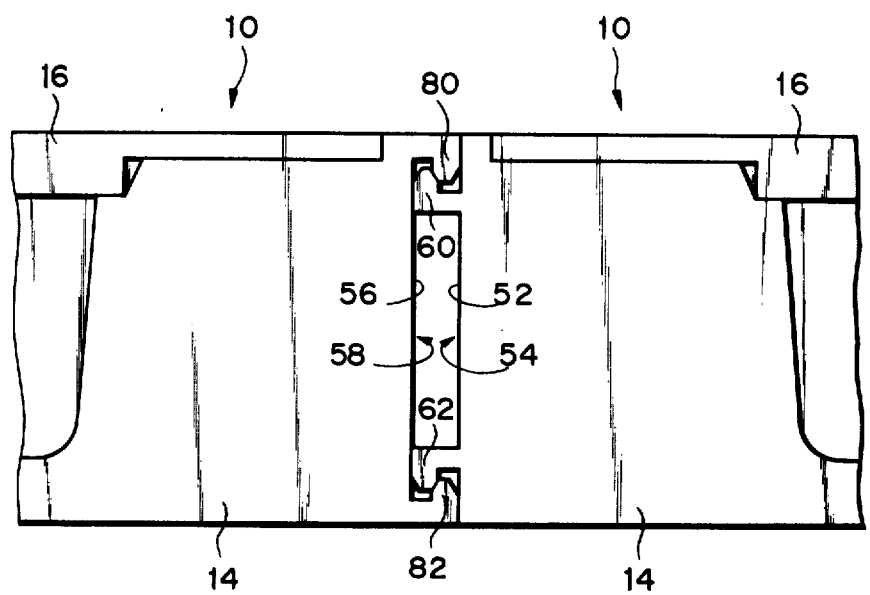
FIG. 14 is a front view showing a state in which the first and second engaged clicks of the second engaging means on the second lateral face of the first tape cassette storage box of FIG. 12 and the first and second engaging clicks of the first engaging means on the first lateral face of the second tape cassette storage box of FIG. 12 are engaged respectively.

When the distance between the first and second tape cassette storage boxes 10 is further narrowed, the first to fourth engaging clicks 60, 62, 64 and 66 of the first engaging means 54 of the second tape cassette storage box 10 engage the first to fourth engaged clicks 80, 82, 84 and 86 of the second engaging means 58 of the first tape cassette storage box 10 to couple the first and second tape cassette storage boxes 10 with each other, as shown in FIG. 14.

At this time, the chamfer portions 98 of the first to fourth engaged clicks 80, 82, 84 and 86 of the second engaging means 58 of the first tape cassette storage box 10 are in contact with the chamfer portions 98 of the first to fourth engaging clicks 60, 62, 64 and 66 of the first engaging means 54 of the second tape cassette storage box 10, respectively, as shown in FIG. 14.

The first and second tape cassette storage boxes 10 coupled with each other may be disengaged from each other by being moved away from each other, following the steps shown in FIGS. 14, 13, 12 and 11 in order.

Referring now to FIGS. 15 to 22, there will be described a second embodiment of this invention. In the description to follow, like reference numerals used in the description of the first embodiment refer to like portions throughout the drawings.

Figure 15:
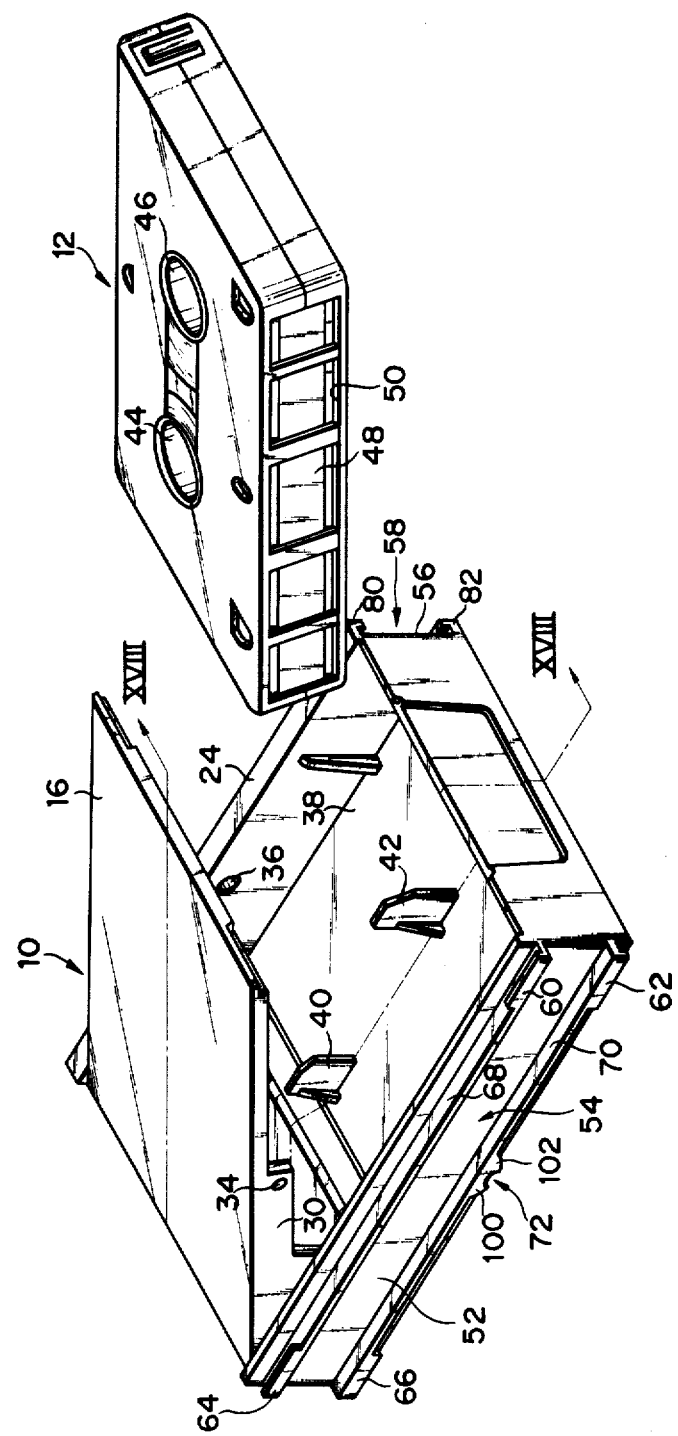
FIG. 15 is a perspective view showing a tape cassette storage box according to a second embodiment of the invention and the micro cassette.

In the second embodiment, as shown in FIGS. 15 and 16, a first guide member 68 of a first engaging means 54 is connected with first and third engaging clicks 60 and 64, and a second guide member 70 is connected with second and fourth engaging clicks 62 and 66.

Further, as shown in FIGS. 15 and 16, a holding device 72 of the second embodiment includes a pair of projections 100 and 102 protruding downward from the central region of the lower surface of the second guide member 70 between the front and rear ends thereof and arranged along the longitudinal direction of the second guide member 70.

As shown in FIG. 17, a held device 92 of the second embodiment includes a projection 104 protruding downward from the central region of the lower surface of a third guide member 88 between the front and rear ends thereof, and a projection 106 protruding upward from the central region of the upper surface of a fourth guide member 90 between the front and rear ends thereof.

Figure 18:
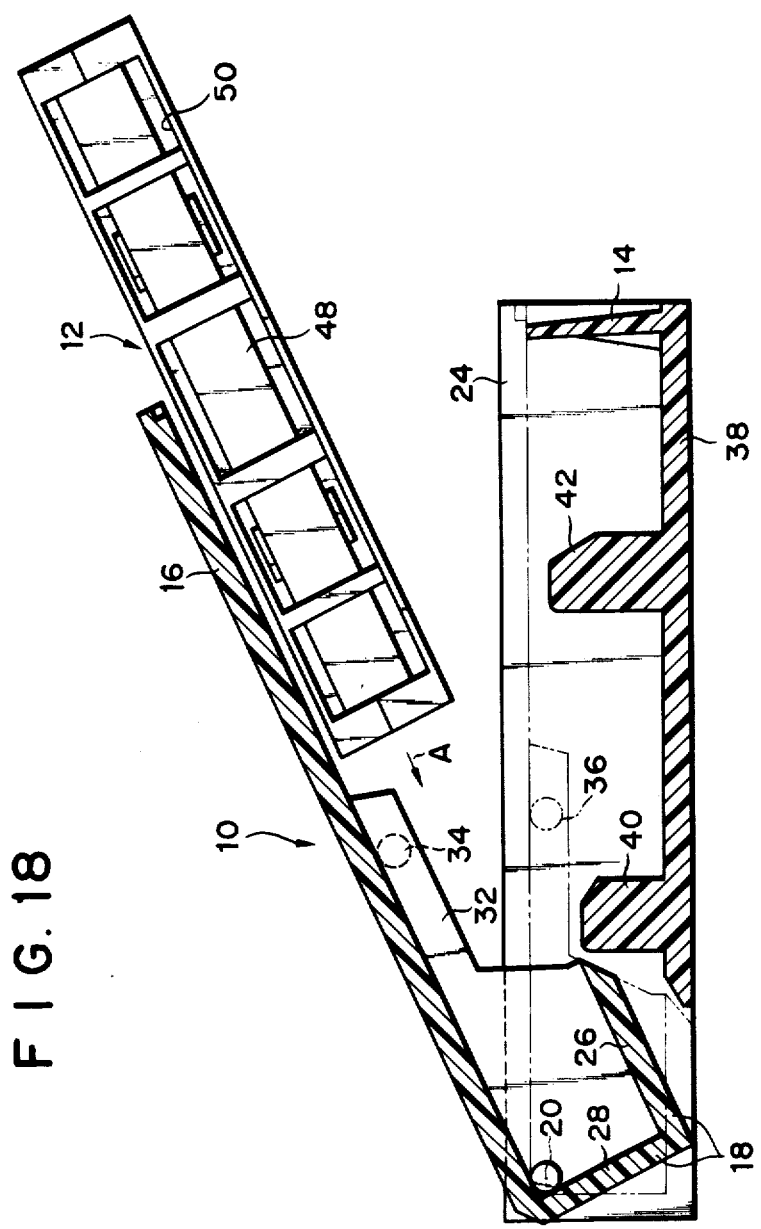
FIG. 18 is a sectional view taken along line XVIII—XVIII of FIG. 15.

As shown in FIGS. 15 and 18, a pair of reel hub stopper members 40 and 42 of the second embodiment are different in height. Namely, the height of the one reel hub stopper member 40 located on the side of the axis of rotation 20 of a cover 16 above a bottom wall 38 is lower than the height of the other stopper member 42 above the bottom wall 38. The height of the one reel hub stopper member 40 is the minimum height to allow the stopper member 40 to reach and circumferentially engage a plurality of engaging projections formed on the inner peripheral surface of the reel hub 44 of the micro cassette 12 located together with the cover 16 in the first position.

Such arrangement may facilitate the loading and removal of the micro cassette 12 into and from the tape cassette storage box 10.

Figure 19:
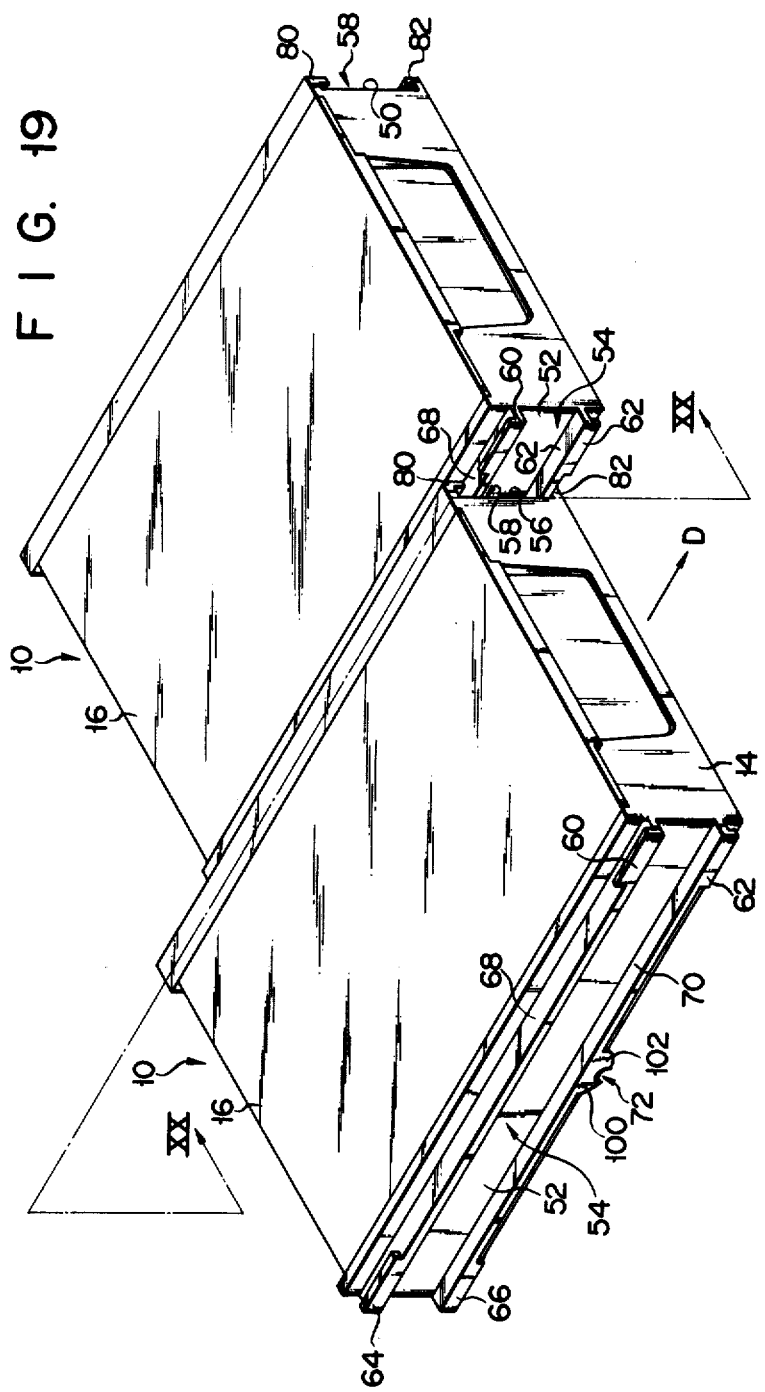
FIG. 19 is a perspective view showing a state immediately before a second engaging means on the second lateral face of a first tape cassette storage box according to the second embodiment and a first engaging means on the first lateral face of a second tape cassette storage box according to the second embodiment engage each other.
Figure 20:
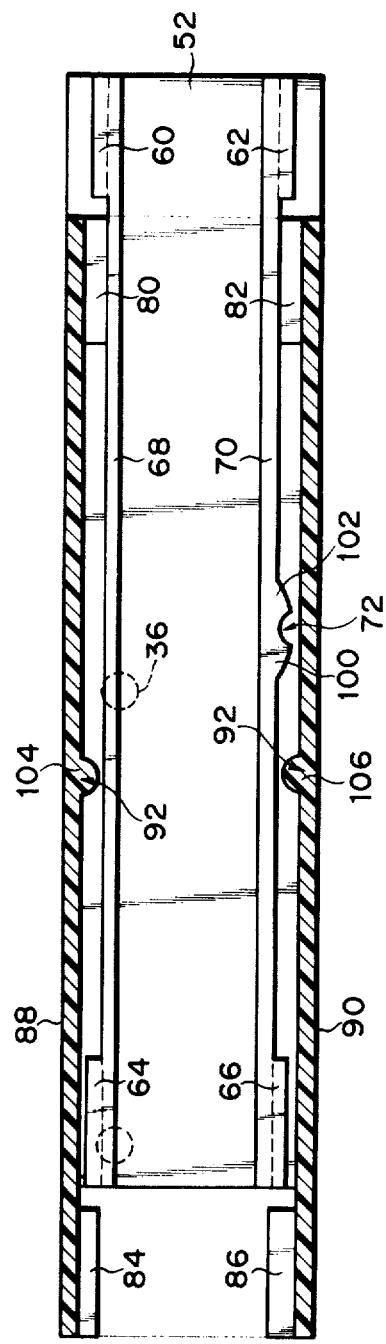
FIG. 20 is a sectional view taken along line XX—XX of FIG. 19.

Hereupon, a second lateral face 56 of a first tape cassette storage box 10 is opposed to a first lateral face 52 of a second tape cassette storage box 10, and a first engaged click 80 of a second engaging means 58 of the first tape cassette storage box 10 is put on the upper surface of the first guide member 68 of the second tape cassette storage box 10 right behind the first engaging click 60, as shown in FIGS. 19 and 20. At the same time, a second engaged click 82 of the second engaging means 58 of the first tape cassette storage box 10 is applied to the lower surface of the second guide member 70 of the second tape cassette storage box 10 right behind the second engaging click 62.

Then, the first tape cassette storage box 10 is moved forward along the first lateral face 52 of the second tape cassette storage box 10, as indicated by arrow D in FIG. 19. At this time, the first and second engaged clicks 80 and 82 of the second engaging means 58 of the first tape cassette storage box 10 slide on the upper surface of the first guide member 68 and the lower surface of the second guide member 70 of the second tape cassette storage box 10, respectively, thereby guiding the first tape cassette storage box 10 in its movement relative to the second tape cassette storage box 10.

The upper surface of the second projection 106 of the held device 92 of the first tape cassette storage box 10 being moved abuts against the one projection 100 of the holding device 72 of the second tape cassette storage box 10 to bend the projection 100 upward. At the same time, the projected end portions of the first to fourth engaging clicks 60, 62, 64 and 66 of the first engaging means 54 of the first tape cassette storage box 10 engage the projected end portions of first to fourth engaged clicks 80, 82, 84 and 86 of the second engaging means 58 of the second tape cassette storage box 10, respectively.

Figure 21:
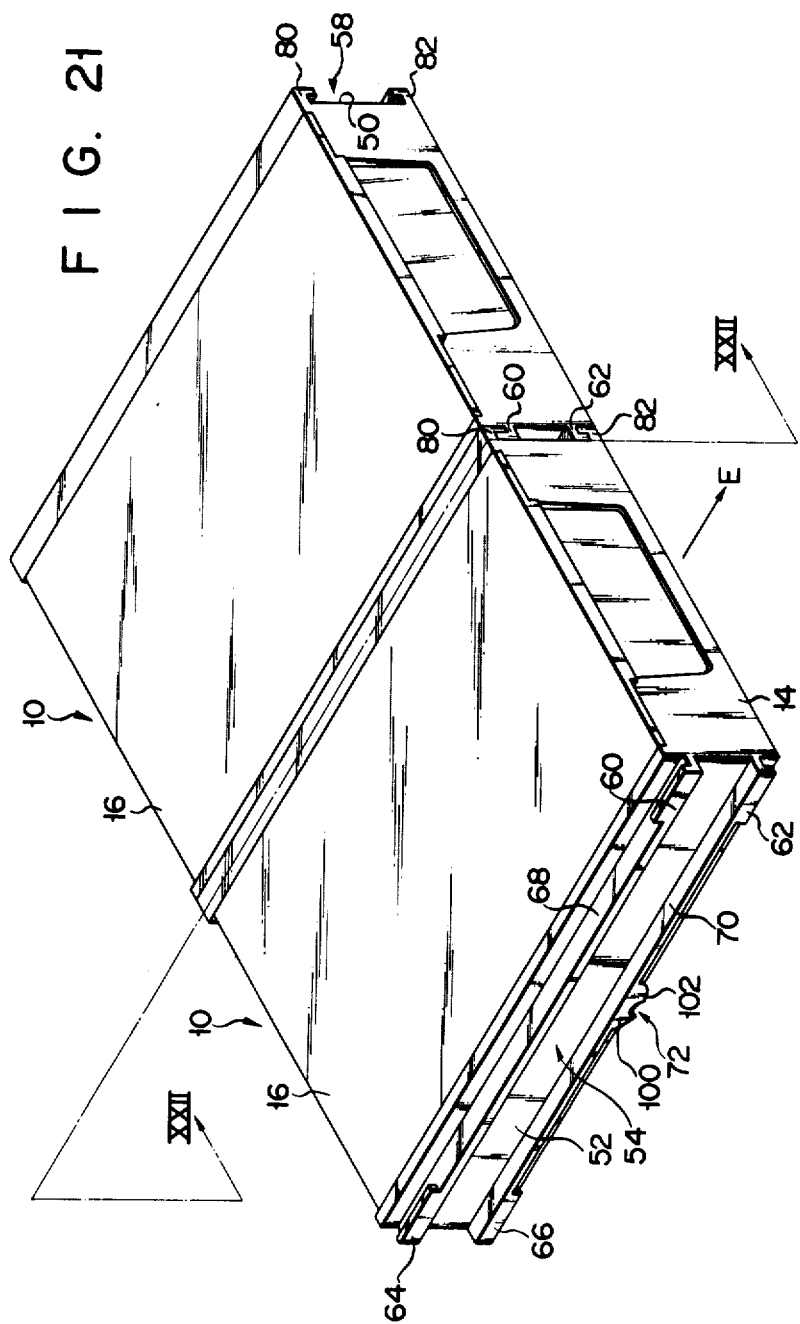
FIG. 21 is a perspective view showing a state in which the second engaging means on the second lateral face of the first tape cassette storage box according to the second embodiment and the first engaging means on the first lateral face of the second tape cassette storage box according to the second embodiment are engaged with each other.
Figure 22:
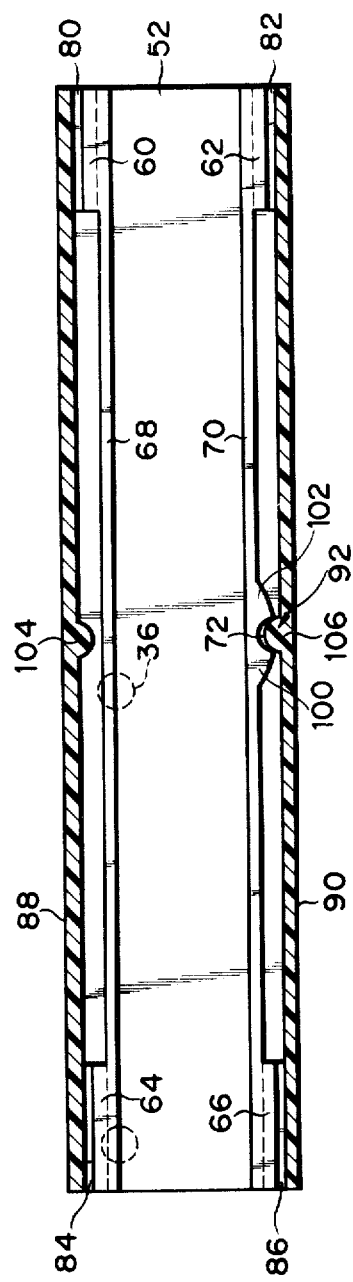
FIG. 22 is a sectional view taken along line XXII—XXII of FIG. 21.

When the respective front end faces of the first and second tape cassette storage boxes 10 are made flush with each other, as shown in FIG. 21, the projection 106 of the held device 92 of the first tape cassette storage box 10 formed on the fourth guide member 90 is held between the pair of projections 100 and 102 of the holding device 72 of the second tape cassette storage box 10, as shown in FIG. 22.

When one of the first and second tape cassette storage boxes 10 coupled as shown in FIG. 21 is subjected to an external force exceeding a given level which is applied in the direction of arrow E of FIG. 21 or oppositely thereto, the projection 106 of the held device 92 of the first tape cassette storage box 10 abuts against one of the pair of projections 100 and 102 of the holding device 72 of the second tape cassette storage box 10, thereby elastically deforming the projection 100 or 102 upward. Thus, the held device 92 of the second tape cassette storage box 10 is disengaged from the holding device 72 of the first tape cassette storage box 10. At this time, the first tape cassette storage box 10 can be moved forward or backward along the first lateral face 52 of the second tape cassette storage box 10. The first tape cassette storage box 10 moving relatively to the second tape cassette storage box 10 is released from the coupling with the second tape cassette storage box 10, as shown in FIG. 19, by moving through a distance equal to the longitudinal length or the length for engagement of the first engaging click 60, following the steps shown in FIGS. 22 and 20 in order.

According to this invention, there is provided a tape cassette storage box which comprises a storage box body for holding a micro cassette, a cover coupled with the storage box body so as to be able to rotate between a first position in which the cover houses, in cooperation with the storage box body, the micro cassette held in the storage box body and a second position in which the cover allows the micro cassette to be removed from the storage box body, a first engaging means formed on a first lateral face out of two rectangular lateral faces of the storage box body intersecting the axis of rotation of the cover, and a second engaging means formed on a second lateral face of the storage box body, the improvement in which the first engaging means includes a first engaging click disposed in a first corner region of the first lateral face, a second engaging click disposed isolatedly from the first engaging click in a second corner region of the first lateral face located in a direction substantially at right angles to the direction for engagement of the first engaging click and having the same length and the same direction for engagement as those of the first engaging click, a third engaging click disposed isolatedly from the first engaging click in a third corner region of the first lateral face located in the direction for engagement of the first engaging click and having the same length and the same direction for engagement as those of the first engaging click, and a fourth engaging click disposed isolatedly from the third and second engaging clicks in a fourth corner region of the first lateral face located in a direction substantially at right angles to the direction for engagement of the third engaging click and in the direction for engagement of the second engaging click and having the same length and the same direction for engagement as those of the first engaging click, and in which the second engaging means includes a first engaged click disposed in a first corner region of the second lateral face, a second engaged click disposed isolatedly from the first engaged click in a second corner region of the second lateral face located in a direction substantially at right angles to the direction for engagement of the first engaged click and having the same length and the same direction for engagement as those of the first engaged click, a third engaged click disposed isolatedly from the first engaged click in a third corner region of the second lateral face located in the direction for engagement of the first engaged click and having the same length and the same direction for engagement as those of the first engaged click, and a fourth engaged click disposed isolatedly from the third and second engaged clicks in a fourth corner region of the second lateral face located in a direction substantially at right angles to the direction for engagement of the third engaged click and in the direction for engagement of the second engaged click and having the same length and the same direction for engagement as those of the first engaged click, so that the first to fourth engaging clicks of the first engaging means of a first tape cassette storage box engage the first to fourth engaged clicks of the second engaging means of a second tape cassette storage box when the first engaging means of the first tape cassette storage box is coupled with the second engaging means of the second tape cassette storage box.

With such arrangement, the first engaging means of the first tape cassette storage box may be engaged with and disengaged from the second engaging means of the second tape cassette storage box by only moving the first tape cassette storage box along the second lateral face of the second tape cassette storage box through a distance equal to the length for engagement of the first engaging click of the first engaging means.

Preferably, in the tape cassette storage box of the invention, the first and third engaging clicks of the first engaging means protrude from the first lateral face substantially at right angles thereto with their projected ends bent away from the second and fourth engaging clicks to extend substantially in parallel with the first lateral face, the second and fourth engaging clicks of the first engaging means protrude from the first lateral face substantially at right angles thereto with their projected ends bent away from the first and third engaging clicks to extend substantially in parallel with the first lateral face, the first and third engaged clicks of the second engaging means protrude from the second lateral face substantially at right angles thereto with their projected ends bent toward the second and fourth engaged clicks to extend substantially in parallel with the second lateral face, and the second and fourth engaged clicks of the second engaging means protrude from the second lateral face substantially at right angles thereto with their projected ends bent toward the first and third engaged clicks to extend substantially in parallel with the second lateral face.

With such arrangement, the first to fourth engaging clicks of the first engaging means and the first to fourth engaged clicks of the second engaging means may be simplified in construction, and hence reduced in manufacturing cost.

Preferably, in the tape cassette storage box of the invention, the first to fourth engaging clicks of the first engaging means are formed integrally with the first lateral face out of a plastic material having elasticity, each of the projected ends of the first to fourth engaging clicks has chamfer portions formed thereon along the direction for engagement thereof, the first to fourth engaged clicks of the second engaging means are formed integrally with the second lateral face out of a plastic material having elasticity, and each of the projected ends of the first to fourth engaged clicks has chamfer portions formed thereon along the direction for engagement thereof, so that the respective chamfer portions of the first to fourth engaged clicks of the second engaging means of the second tape cassette storage box are brought into contact with the respective chamfer portions of the first to fourth engaging clicks of the first engaging means of the first tape cassette storage box when the second engaging means of the second tape cassette storage box is brought into contact with the first engaging means of the first tape cassette storage box along a direction to cross the direction for engagement of the first engaging means.

With such arrangement, the first engaging means of the first tape cassette storage box and the second engaging means of the second tape cassette storage box may be engaged with or disengaged from each other also by bringing them close to or separating them from each other in a direction to cross their direction for engagement.

Preferably, in the tape cassette storage box of the invention, the first engaging means includes a holding device, and the second engaging means includes a held device, so that the holding device of the first engaging means of the first tape cassette storage box holds the held device of the second engaging means of the second tape cassette storage box to maintain the engagement between the first engaging means of the first tape cassette storage box and the second engaging means of the second tape cassette storage box until an external force extending a given level is applied to the first and second tape cassette storage boxes when the first to fourth engaged clicks of the second engaging means of the second tape cassette storage box get engaged with the first to fourth engaging clicks of the first engaging means of the first tape cassette storage box.

With such arrangement, there is hardly any fear of the engagement between the first engaging means of the first tape cassette storage box and the second engaging means of the second tape cassette storage box being removed due to an error or accident.

Preferably, in the tape cassette storage box of the invention, the first engaging means includes first and second guide members disposed between the first and third engaging clicks and between the second and fourth engaging clicks, respectively, so that the first engaging means of the first tape cassette storage box and the second engaging means of the second tape cassette storage box are coupled with each other as the first and third engaged clicks and the second and fourth engaged clicks of the second engaging means of the second tape cassette storage box are guided by the first and second guide members of the first engaging means of the first tape cassette storage box, respectively.

Such arrangement may facilitate the operation to engage the first engaging means of the first tape cassette storage box with the second engaging means of the second tape cassette storage box.

Preferably, in the tape cassette storage box of the invention, the first guide member is in the form of a band plate extending along an imaginary straight line connecting the first and third engaging clicks and protruding substantially at right angles to the first lateral face, and the second guide member is in the form of a band plate extending along an imaginary straight line connecting the second and fourth engaging clicks and protruding substantially at right angles to the first lateral face, so that the first to fourth engaged clicks of the second engaging means of the second tape cassette storage box are coupled with the first to fourth engaging clicks of the first engaging means of the first tape cassette storage box when the projected end faces of the first and second engaged clicks or the third and fourth engaged clicks of the second engaging means of the second tape cassette storage box are brought slidingly into contact with the first and second guide members of the first engaging means of the first tape cassette storage box, respectively.

With such arrangement, the first and second guide members may be simplified in construction to facilitate the manufacture thereof.

Preferably, in the tape cassette storage box of the invention, the second engaging means includes a third guide member in the form of a band plate formed on the second lateral face along an imaginary straight line connecting the first and third engaged clicks and protruding substantially at right angles to the second lateral face, and a fourth guide member in the form of a band plate formed on the second lateral face along an imaginary straight line connecting the second and fourth engaged clicks and protruding substantially at right angles to the second lateral face, the holding device of the first engaging means includes openings formed in the respective central regions of the first and second guide members along the direction for guidance thereof, whereby the central regions are separated from the first lateral face, a first stopper formed on the first engaging click side of the first guide member in the central region thereof and projecting in the same direction as the projected end portions of the first and third engaging clicks, and a second stopper formed on the fourth engaging click side of the second guide member in the central region thereof and projecting in the same direction as the projected end portions of the second and fourth engaging clicks, and the held device of the second engaging means includes a first engaged projection formed in the central region of the third guide member along the direction for guidance thereof and projecting in the same direction as the projected end portions of the first and third engaged clicks, and a second engaged projection formed in the central region of the fourth guide member along the direction for guidance thereof and projecting in the same direction as the projected end portions of the second and fourth engaged clicks, so that the first and second engaged projections of the second engaging means of the second tape cassette storage box are brought into contact with the first and second stoppers of the first engaging means of the first tape cassette storage box to maintain the engagement between the first engaging means of the first tape cassette storage box and the second engaging means of the second tape cassette storage box until an external force exceeding a given level is applied to the first and second tape cassette storage boxes when the first to fourth engaged clicks of the second engaging means of the second tape cassette storage box get engaged with the first to fourth engaging clicks of the first engaging means of the first tape cassette storage box.

With such arrangement, the holding and held devices may be simplified in construction.

Preferably, in the tape cassette storage box of the invention, the first and second engaged projections of the engaged device of the second engaging means are hollow.

With such arrangement, the holding and held devices may work smoothly.

Alternatively, the tape cassette storage box of the invention may be so constructed that the second engaging means includes a third guide member in the form of a band plate formed on the second lateral face along an imaginary straight line connecting the first and third engaged clicks and protruding substantially at right angles to the second lateral face, and a fourth guide member in the form of a band plate formed on the second lateral face along an imaginary straight line connecting the second and fourth engaged clicks and protruding substantially at right angles to the second lateral face, the holding device of the first engaging means includes a pair of projections arranged on the central region of at least one of the first and second guide members along the direction for guidance thereof, and the held device of the second engaging means includes a projection formed on the central region of each of the third and fourth guide members along the direction for guidance thereof, so that at least one of the pair of projections of the holding device of the first engaging means of the first tape cassette storage box holds at least one of the projections of the third and fourth guide members of the second engaging means of the second tape cassette storage box to maintain the engagement between the first engaging means of the first tape cassette storage box and the second engaging means of the second tape cassette storage box until an external force exceeding a given level is applied to the first and second tape cassette storage boxes when the first to fourth engaged clicks of the second engaging means of the second tape cassette storage box get engaged with the first to fourth engaging clicks of the first engaging means of the first tape cassette storage box.

Although illustrative embodiments of this invention have been described in detail herein, it is to be understood that the invention is not limited to those precise embodiments, and that various changes and modifications may be effected therein by one skilled in the art without departing from the scope or spirit of the invention.

What we claim is:

1. A tape cassette storage box comprising a storage box body for holding a micro cassette, a cover coupled with said storage box body and being rotatable between a first position in which said cover houses, in cooperation with said storage box body, the micro cassette held in said storage box body and a second position in which said cover allows said micro cassette to be removed from said storage box body, a first engaging means formed on a first lateral face out of two rectangular lateral faces of said storage box body intersecting the axis of rotation of said cover, and a second engaging means formed on a second lateral face of said storage box body, the improvement wherein:
said first engaging means includes a first click-type engaging means disposed in a first corner region of said first lateral face, a second click-type engaging means disposed isolatedly from said first click-type engaging means in a second corner region of said first lateral face located in a direction substantially at right angles to the direction for engagement of said first click-type engaging means and having the same length and the same direction of engagement as those of said first click-type engaging means, a third click-type engaging means disposed isolatedly from said first click-type engaging means in a third corner region of said first lateral face located in the direction for engagement of said first click-type engaging means and having the same length and the same direction for engagement as those of said first click-type engaging means, and a fourth click-type engaging means disposed isolatedly from said third and second click-type engaging means in a fourth corner region of said first lateral face located in a direction substantially at right angles to the direction for engagement of said third click-type engaging means and in the direction for engagement of said second click-type engaging means and having the same length and the same direction for engagement as those of said first click-type engaging means; and said second engaging means includes a first click-type engaged means disposed in a first corner region of said second lateral face, a second click-type engaged means disposed isolatedly from said first click-type engaged means in a second corner region of said second lateral face located in a direction substantially at right angles to the direction for engagement of said first click-type engaged means and having the same length and the same direction for engagement as those of said first click-type engaged means, a third click-type engaged means disposed isolatedly from said first click-type engaged means in a third corner region of said second lateral face located in the direction for engagement of said first click-type engaged means and having the same length and the same direction for engagement as those of said first click-type engaged means, and a fourth click-type engaged means disposed isolatedly from said third and second click-type engaged means in a fourth corner region of said second lateral face located in a direction substantially at right angles to the direction for engagement of said third click-type engaged means and in the direction for engagement of said second click-type engaged means and having the same length and the same direction for engagement as those of said first click-type engaged means, said first and third click-type engaging means of said first engaging means protruding from said first lateral face substantially at right angles thereto with their projected ends bent away from said second and fourth click-type engaging means to extend substantially in parallel with said first lateral face;

said second and fourth click-type engaging means of said first engaging means protruding from said first lateral face substantially at right angles thereto with their projected ends bent away from said first and third click-type engaging means to extend substantially in parallel with said first lateral face;

said first and third click-type engaged means of said second engaging means protruding from said second lateral face substantially at right angles thereto with their projected ends bent toward said second and fourth click-type engaged means to extend substantially in parallel with said second lateral face; and said second and fourth click-type engaged means of said second engaging means protruding from said second lateral face substantially at right angles thereto with their projected ends bent toward said first and third click-type engaged means to extend substantially in parallel with said second lateral face, whereby said first to fourth click-type engaging means of said first engaging means of a first tape cassette storage box engages said first to fourth click-type engaged means of said second engaging means of a second tape cassette storage box when said first engaging means of said first tape cassette storage box is coupled with said second engaging means of said second tape cassette storage box.

2. A tape cassette storage box according to claim 1, wherein the first to fourth click-type engaging means of said first engaging means are formed integrally with said first lateral face out of a plastic material having elasticity;

each of the projected ends of said first to fourth click-type engaging means has chamfer portions formed thereon along the direction for engagement thereof;

the first to fourth click-type engaged means of said second engaging means are formed integrally with said second lateral face out of a plastic material having elasticity; and each of the projected ends of said first to fourth click-type engaged means has chamfer portions formed thereon along the direction for engagement thereof, so that the respective chamfer portions of the first to fourth click-type engaged means of said second engaging means of the second tape cassette storage box are brought into contact with the respective chamfer portions of the first to fourth click-type engaging means of said first engaging means of the first tape cassette storage box when said second engaging means of said second tape cassette storage box is brought into contact with said first engaging means of said first tape cassette storage box along a direction to cross the direction for engagement of said first engaging means.

3. A tape cassette storage box according to claim 1, wherein:

said first engaging means includes a holding device; and said second engaging means includes a held device, the holding device of said first engaging means of the first tape cassette storage box holding the held device of said second engaging means of the second tape cassette storage box to maintain the engagement between said first engaging means of said first tape cassette storage box and said second engaging means of said second tape cassette storage box until an external force exceeding a given level is applied to said first and second tape cassette storage boxes when the first to fourth click-type engaged means of said second engaging means of said second tape cassette storage box get engaged with the first to fourth click-type engaging means of said first engaging means of said first tape cassette storage box.

4. A tape cassette storage box according to claim 3, wherein the first to fourth click-type engaging means of said first engaging means are formed integrally with said first lateral face out of a plastic material having elasticity;

each of the projected ends of said first to fourth click-type engaging means has chamfer portions formed thereon along the direction for engagement thereof;

the first to fourth click-type engaged means of said second engaging means are formed integrally with said second lateral face out of a plastic material having elasticity; and each of the projected ends of said first to fourth click-type engaged means has chamfer portions formed thereon along the direction for engagement thereof, so that the respective chamfer portions of the first to fourth click-type engaged means of said second engaging means of the second tape cassette storage box are brought into contact with the respective chamfer portions of the first to fourth click-type engaging means of said first engaging means of the first tape cassette storage box when said second engaging means of said tape cassette storage box is brought into contact with said first engaging means of said first tape cassette storage box along a direction to cross the direction for engagement of said first engaging means.

5. A tape cassette storage box according to claim 1, wherein said first engaging means includes first and second guide members disposed between said first and third click-type engaging means and between said second and fourth click-type engaging means, respectively, so that said first engaging means of the first tape cassette storage box and said second engaging means of the second tape cassette storage box are coupled with each other as the first and third click-type engaged means and the second and fourth click-type engaged means of said second engaging means of said second tape cassette storage box are guided by the first and second guide members of said first engaging means of said first tape cassette storage box, respectively.

6. A tape cassette storage box according to claim 5, wherein said first to fourth click-type engaging means and said first and second guide members are isolated from one another;

said first to fourth engaging means of said first engaging means are formed integrally with said first lateral face out of a plastic material having elasticity;

each of the projected ends of said first to fourth click-type engaging means has chamfer portions formed thereon along the direction for engagement thereof;

said first to fourth click-type engaged means of said second engaging means are formed integrally with said second lateral face out of a plastic material having elasticity; and each of the projected ends of said first to fourth click-type engaged means has chamfer portions formed thereon along the direction for engagement thereof, so that the respective chamfer portions of the first to fourth click-type engaged means of said second engaged means of the second tape cassette storage box are brought into contact with the respective chamfer portions of the first to fourth click-type engaging means of said first engaging means of the first tape cassette storage box when said second engaging means of said second tape cassette storage box is brought into contact with said first engaging means of said first tape cassette storage box along a direction to cross the direction for engagement of said first engaging means.

7. A tape cassette storage box according to claim 5, wherein said first guide member is in the form of a band plate extending along an imaginary straight line connecting said first and third click-type engaging means and protruding substantially at right angles to said first lateral face; and said second guide member is in the form of a band plate extending along an imaginary straight line connecting said second and fourth click-type engaging means and protruding substantially at right angles to said first lateral face, so that the first to fourth click-type engaged means of said second engaging means of the second tape cassette storage box are coupled with the first to fourth click-type engaging means of said first engaging means of the first tape cassette storage box when the projected end faces of the first and second click-type engaged means or the third and fourth click-type engaged means of said second engaging means of said second tape cassette storage box are brought slidingly into contact with the first and second guide members of said first engaging means of said first tape cassette storage box, respectively.

8. A tape cassette storage box according to claim 7, wherein said first to fourth click-type engaging means and said first and second guide members are isolated from one another;

said first to fourth engaging means of said first engaging means are formed integrally with said first lateral face out of a plastic material having elasticity;

each of the projected ends of said first to fourth click-type engaging means has chamfer portions formed thereon along the direction for engagement thereof;

said first to fourth click-type engaged means of said second engaging means are formed integrally with said second lateral face out of a plastic material having elasticity; and each of the projected ends of said first to fourth click-type engaged means has chamfer portions formed thereon along the direction for engagement thereof, so that the respective chamfer portions of the first to fourth click-type engaged means of said second engaging means of the second tape cassette storage box are brought into contact with the respective chamfer portions of the first to fourth click-type engaging means of said first engaging means of the first tape cassette storage box when said second engaging means of said second tape cassette storage box is brought into contact with said first engaging means of said first tape cassette storage box along a direction to cross the direction for engagement of said first engaging means.

9. A tape cassette storage box according to claim 7, wherein said first engaging means includes a holding device; and said second engaging means includes a held device, the holding device of said first engaging means of the first tape cassette storage box holding the held device of said second engaging means of the second tape cassette storage box to maintain the engagement between said first engaging means of said first tape cassette storage box and said second engaging means of said seocnd tape cassette storage box until an external force exceeding a given level is applied to said first and second tape cassette storage boxes when the first to fourth click-type engaged means of said second engaging means of said second tape cassette storage box get engaged with the first to fourth click-type engaging means of said first engaging means of said first tape cassette storage box.

10. A tape cassette storage box according to claim 9, wherein
said first to fourth click-type engaging means and said first and second guide members are isolated from one another;
said first to fourth click-type engaging means of said first engaging means are formed integrally with said first lateral face out of a plastic material having elasticity;
each of the projected ends of said first to fourth click-type engaging means has chamfer portions formed thereon along the direction for engagement thereof;
said first to fourth click-type engaged means of said second engaging means are formed integrally with said second lateral face out of a plastic material having elasticity; and
each of the projected ends of said first to fourth click-type engaged means has chamfer portions formed thereon along the direction for engagement thereof, so that the respective chamfer portions of the first to fourth click-type engaged means of said second engaging means of the second tape cassette storage box are brought into contact with the respective chamfer portions of the first to fourth click-type engaging means of said first engaging means of the first tape cassette storage box when said second engaging means of said second tape cassette storage box is brought into contact with said first engaging means of said first tape cassette storage box along a direction to cross the direction for engagement of said first engaging means.

11. A tape cassette storage box according to claim 9, wherein
said second engaging means includes a third guide member in the form of a band plate formed on said second lateral face along an imaginary straight line connecting said first and third click-type engaged means and protruding substantially at right angles to said second lateral face, and a fourth guide member in the form of a band plate formed on said second lateral face along an imaginary straight line connecting said second and fourth click-type engaged means and protruding substantially at right angles to said second lateral face;
the holding device of said first engaging means includes openings formed in the respective central regions of said first and second guide members along the direction for guidance thereof, whereby said central regions are separated from said first lateral face, a first stopper formed on the first click-type engaging means side of said first guide member in the central region thereof and projecting in the same direction as the projected end portions of said first and third click-type engaging means, and a second stopper formed on the fourth click-type engaging means side of said second guide member in the central region thereof and projecting in the same direction as the projected end portions of said second and fourth click-type engaging means; and
the held device of said second engaging means includes a first engaged projection formed in the central region of said third guide member along the direction for guidance thereof and projecting in the same direction as the projected end portions of said first and third click-type engaged means, and a second engaged projection formed in the central region of said fourth guide member along the direction for guidance thereof and projecting in the same direction as the projected end portions of said second and fourth click-type engaged means, so that the first and second engaged projections of said second engaging means of the second tape cassette storage box are brought into contact with the first and second stoppers of said first engaging means of the first tape cassette storage box to maintain the engagement between said first engaging means of said first tape cassette storage box and said second engaging means of said second tape cassette storage box until an external force exceeding a given level is applied to said first and second tape cassette storage boxes when the first to fourth click-type engaged means of said second engaging means of said second tape cassette storage box get engaged with the first to fourth click-type engaging means of said first engaging means of said first tape cassette storage box.

12. A tape cassette storage box according to claim 11, wherein
said first to fourth click-type engaging means and said first and second guide members are isolated from one another;
said first to fourth engaging means of said first engaging means are formed integrally with said first lateral face out of a plastic material having elasticity;
each of the projected ends of said first to fourth click-type engaging means has chamfer portions formed thereon along the direction for engagement thereof;
said first to fourth click-type engaged means of said second engaging means are formed integrally with said second lateral face out of a plastic material having elasticity; and
each of the projected ends of said first to fourth click-type engaged means has chamfer portions formed thereon along the direction for engagement thereof, so that the respective chamfer portions of the first to fourth click-type engaged means of said second engaging means of the second tape cassette storage box are brought into contact with the respective chamfer portions of the first to fourth click-type engaging means of said first engaging means of the first tape cassette storage box when said second engaging means of said second tape cassette storage box is brought into contact with said first engaging means of said first tape cassette storage box along a direction to cross the direction for engagement of said first engaging means.

13. A tape cassette storage box according to claim 12, wherein the first and second engaged projections of the engaged device of said second engaging means are hollow.

14. A tape cassette storage box according to claim 13, wherein said first to fourth click-type engaging means and said first and second guide members are isolated from one another;

said first to fourth engaging means of said first engaging means are formed integrally with said first lateral face out of a plastic material having elasticity;

each of the projected ends of said first to fourth click-type engaging means has chamfer portions formed thereon along the direction for engagement thereof;

said first to fourth click-type engaged means of said second engaging means are formed integrally with said second lateral face out of a plastic material having elasticity; and each of the projected ends of said first to fourth click-type engaged means has chamfer portions formed thereon along the direction for engagement thereof, so that the respective chamfer portions of the first to fourth click-type engaged means of said second engaging means of the second tape cassette storage box are brought into contact with the respective chamfer portions of the first to fourth click-type engaging means of said first engaging means of the first tape cassette storage box when said second engaging means of said second tape cassette storage box is brought into contact with said first engaging means of said first tape cassette storage box along a direction to cross the direction for engagement of said first engaging means.

15. A tape cassette storage box according to claim 9, wherein said second engaging means includes a third guide member in the form of a band plate formed on said second lateral face along an imaginary straight line connecting said first and second click-type engaged means and protruding substantially at right angles to said second lateral face, and a fourth guide member in the form of a band plate formed on said second lateral face along an imaginary straight line connecting said second and fourth click-type engaged means and protruding substantially at right angles to said second lateral face;

the holding device of said first engaging means includes a pair of projections arranged on the central region of at least one of said first and second guide members along the direction for guidance thereof; and the held device of said second engaging means includes a projection formed on the central region of each of said third and fourth guide members along the direction for guidance thereof, so that at least one of the pair of projections of the holding device of said first engaging means of the first tape cassette storage box holds at least one of the projections of the third and fourth guide members of said second engaging means of the second tape cassette storage box to maintain the engagement between said first engaging means of said first tape cassette storage box and said second engaging means of said second tape cassette storage box until an external force exceeding a given level is applied to said first and second tape cassette storage boxes when the first to fourth click-type engaged means of said second engaging means of said second tape cassette storage box get engaged with the first to fourth click-type engaging means of said first engaging means of said first tape cassette storage box.

* * * * *